US012766959B2

(12) United States Patent
Iwaki

(10) Patent No.: US 12,766,959 B2
(45) Date of Patent: Oct. 20, 2026

(54) NOTIFICATION DEVICE

(71) Applicant: TOYOTA JIDOSHA KABUSHIKI KAISHA, Toyota (JP)

(72) Inventor: Yoshiya Iwaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 64 days.

(21) Appl. No.: 18/953,557

(22) Filed: Nov. 20, 2024

(65) Prior Publication Data

US 2025/0256575 A1 Aug. 14, 2025

(30) Foreign Application Priority Data

Feb. 13, 2024 (JP) ................................ 2024-019626

(51) Int. Cl.
*B60K 35/28* (2024.01)

(52) U.S. Cl.
CPC ........ *B60K 35/28* (2024.01); *B60K 2360/167* (2024.01); *B60K 2360/21* (2024.01)

(58) Field of Classification Search
CPC .............. B60K 35/28; B60K 2360/167; B60K 2360/21
USPC .......................................................... 340/441
See application file for complete search history.

(56) References Cited

U.S. PATENT DOCUMENTS 7,671,727 B2 * 3/2010 Flick ........................ G08G 1/20 340/936
8,125,326 B2 * 2/2012 Romp .................. B60W 50/14 340/459
9,177,470 B2 * 11/2015 Hamberger ...... G08G 1/096716
9,835,468 B2 12/2017 Yoshitomi et al.
9,988,050 B2 * 6/2018 Yamashita ............ B60W 10/18
10,017,178 B2 7/2018 Morimoto et al.
10,132,642 B2 11/2018 Yoshitomi et al.
10,679,077 B2 6/2020 Kinoshita et al.
11,010,624 B2 5/2021 Hayashi et al.
11,017,247 B2 5/2021 Hayashi et al.
11,117,595 B2 9/2021 Sasaki et al.
12,518,627 B2 * 1/2026 Matsuoka ............. G08G 1/052
2017/0072952 A1 * 3/2017 Sim ..................... B60W 30/146
2021/0247526 A1 8/2021 Kijima

FOREIGN PATENT DOCUMENTS

CN 115257368 A * 11/2022 ............ B60K 31/18
JP 2012-062034 A 3/2012
JP 2017129943 A * 7/2017

(Continued)

*Primary Examiner* — Eric Blount

(74) *Attorney, Agent, or Firm* — SoraIP, Inc.

(57) ABSTRACT

The notification device includes: a speed limit recognition unit that recognizes a speed limit of a traveling region in which the own vehicle travels on the basis of at least one of a captured image of a camera of the own vehicle and a map database; a traveling speed recognition unit that recognizes a traveling speed of the own vehicle on the basis of a detection result of an internal sensor of the own vehicle; a cumulative value calculation unit that calculates a cumulative value of speed limit excess traveling in a state where the traveling speed of the own vehicle exceeds the speed limit; and a notification control unit that, when the traveling speed of the own vehicle exceeds the speed limit, executes the speed limit excess notification to the driver of the own vehicle.

4 Claims, 5 Drawing Sheets

(56) References Cited

FOREIGN PATENT DOCUMENTS

| | | | |
|---|---|---|---|
| JP | 6288204 B1 * | 3/2018 | |
| JP | 6304126 B2 * | 4/2018 | ............ B60W 50/00 |
| JP | 6331232 B2 * | 5/2018 | |

* cited by examiner

NOTIFICATION DEVICE

CROSS-REFERENCE TO RELATED APPLICATION

This application claims priority to Japanese Patent Application No. 2024-019626 filed on Feb. 13, 2024, incorporated herein by reference in its entirety.

BACKGROUND

1. Technical Field

The present disclosure relates to a notification device.

2. Description of Related Art

Conventionally, Japanese Unexamined Patent Application Publication No. 2012-062034 (JP 2012-062034 A) is known as technology related to a notification device. JP 2012-062034 A discloses technology in which a notification to a driver is executed when a traveling speed of an own vehicle exceeds a speed limit.

SUMMARY

In the conventional technology, the traveling speed of the own vehicle may have a relatively strong tendency to exceed the speed limit. In this case, if the notification is executed every time the traveling speed of the own vehicle exceeds the speed limit, there is a risk that the driver feels annoyed.

An objective of the present disclosure is to provide a notification device that can reduce annoyance of a driver.

The notification device of the present disclosure is a notification device that executes a notification to a driver of an own vehicle, the notification device including a speed limit recognition unit that recognizes a speed limit of a traveling region in which the own vehicle travels based on at least one of a captured image of a camera of the own vehicle and a map database, a traveling speed recognition unit that recognizes a traveling speed of the own vehicle based on a detection result of an internal sensor of the own vehicle, a cumulative value calculation unit that calculates a cumulative value of speed limit excess traveling in a state in which the traveling speed of the own vehicle exceeds the speed limit, and a notification control unit that executes a speed limit excess notification to the driver of the own vehicle when the traveling speed of the own vehicle exceeds the speed limit, in which the notification control unit decreases a degree of the speed limit excess notification as the cumulative value of speed limit excess traveling increases.

According to the present disclosure, it becomes possible to provide a notification device that can reduce annoyance of a driver.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described with reference to the drawings.

Figure 1:
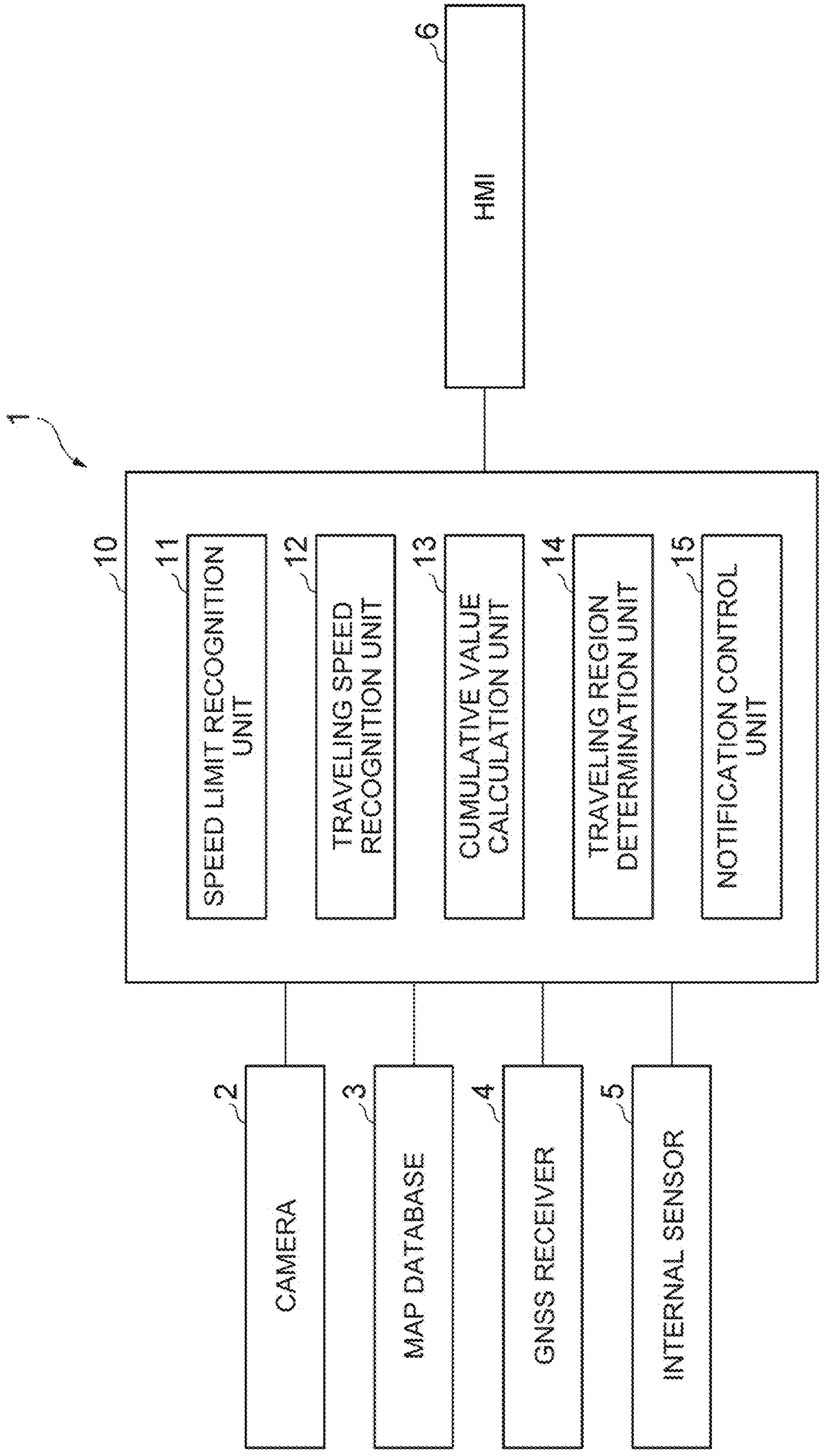
FIG. 1 is a block diagram of a notification device according to an embodiment.

FIG. 1 is a block diagram of a notification device according to an embodiment. The notification device 1 illustrated in FIG. 1 is used, for example, in an automated driving vehicle, a driving support vehicle, or the like. In the present embodiment, the notification device 1 is mounted on the own vehicle. The notification device 1 performs notification to the driver of the own vehicle.

As illustrated in FIG. 1, the notification device 1 includes a camera 2, a map database 3, a Global Navigation Satellite System [GNSS] signal-receiving unit 4, an internal sensor 5, a Human Machine Interface [HMI] 6, and an Electronic Control Unit [ECU] 10.

The camera 2 is provided in a vehicle cabin of the own vehicle. The camera 2 captures an image of the front of the own vehicle via, for example, a windshield of the own vehicle. The camera 2 is, for example, a monocular camera. The camera 2 may be, for example, a stereo camera. The camera 2 transmits the captured images to ECU 10.

The map database 3 is a database that stores map information. The map database 3 is formed in a server capable of communicating with the own vehicle. The map information includes, for example, information about a road, an intersection, and the like. The map information includes information on a speed limit of each traveling region, a type of the traveling region, and the like. Examples of the type of the traveling region include an expressway, an urban area, and the like. The map database 3 may be formed in a storage device such as a Hard Disk Drive [HDD mounted on the own vehicle.

GNSS signal receiver 4 measures the position of the own vehicle (for example, the latitude and longitude of the own vehicle) by receiving a signal from the positioning satellites. GNSS signal-receiving unit 4 transmits the position information of the own vehicle to ECU 10.

The internal sensor 5 is a detection device that detects a traveling state of the own vehicle. The internal sensor 5 includes, for example, a vehicle speed sensor. The vehicle speed sensor is a detector that detects a traveling speed of the own vehicle. The internal sensor 5 transmits information about the traveling speed of the own vehicle to ECU 10.

HMI 6 is an interface for inputting and outputting data between the own vehicle and the occupant in response to a control signal from ECU 10. HMI 6 includes a display, a speaker, and the like. HMI 6 notifies the occupant of the notification by a display screen of the display or a notification sound of the speaker.

ECU 10 is an electronic control unit having a Central Processing Unit [CPU] and a storage device such as Read Only Memory [ROM] or Random Access Memory [RAM. In ECU 10, for example, various functions are realized by executing a program stored in a storage device in a CPU. ECU 10 is provided in the own vehicle, for example.

ECU 10 includes, as a functional configuration, a speed limit recognition unit 11, a traveling speed recognition unit

12, a cumulative value calculation unit 13, a traveling region determination unit 14, and a notification control unit 15.

The speed limit recognition unit 11 recognizes the speed limit of the traveling region in which the own vehicle travels, based on the captured image of the camera 2 of the own vehicle and the map database 3. Specifically, the speed limit recognition unit 11 recognizes the speed limit of the traveling region in which the own vehicle travels based on the captured image of the road sign captured by the camera 2. The road sign indicates a speed limit corresponding to, for example, a vehicle type. The speed limit recognition unit 11 recognizes the speed limit of the same vehicle type as the vehicle type of the own vehicle. When the vehicle type indicated by the road sign is the same as the vehicle type of the own vehicle, the speed limit recognition unit 11 recognizes the speed limit indicated by the road sign. When the vehicle type indicated by the road sign is different from the vehicle type of the own vehicle, the speed limit recognition unit 11 does not recognize the speed limit indicated by the road sign.

For example, the speed limit recognition unit 11 recognizes the speed limit from the captured image of the road sign by using a well-known image processing method such as edge extraction, noise removal, pattern matching, or the like, or a machine learning model learned by deep learning or the like. The speed limit recognition unit 11 recognizes the speed limit of the position of the own vehicle measured by GNSS receiving unit 4 in the map data stored in the map database 3.

The traveling speed recognition unit 12 recognizes the traveling speed of the own vehicle based on the detection result of the internal sensor 5 of the own vehicle.

The cumulative value calculation unit 13 calculates the cumulative value of speed limit excess traveling in a state in which the traveling speed of the own vehicle exceeds the speed limit (hereinafter, may be referred to as "overspeed"). The cumulative value of speed limit excess traveling is the cumulative travel time of the own vehicle in a state in which the traveling speed of the own vehicle exceeds the limit speed, or the cumulative travel distance of the own vehicle in a state in which the traveling speed of the own vehicle exceeds the limit speed. For example, when the own vehicle is traveling in a predetermined traveling region (for example, a predetermined section of an expressway), the cumulative value calculation unit 13 calculates the cumulative value (cumulative traveling time) of the time when the own vehicle travels beyond the speed limit of the traveling region. For example, when the own vehicle is traveling in a predetermined traveling region (for example, a predetermined section of an expressway), the cumulative value calculation unit 13 calculates the cumulative value (cumulative traveling distance) of the distance traveled by the own vehicle exceeding the speed limit of the traveling region. The cumulative value of speed limit excess traveling indicates the driving tendency of the driver (frequency or period of the overrunning speed, etc.).

The traveling region determination unit 14 determines the type of the traveling region in which the own vehicle travels based on the captured image of the camera 2 of the own vehicle and the map database 3. Specifically, the traveling region determination unit 14 determines the type of the traveling region in which the own vehicle travels based on the captured image of the road sign captured by the camera 2.

The traveling region determination unit 14 determines the type of the traveling region from the captured image of the road sign by using a well-known image processing method such as edge extraction, noise removal, pattern matching, or the like, or a machine learning model learned by deep learning or the like. The traveling region determination unit 14 determines the type of the traveling region corresponding to the position of the own vehicle measured by GNSS receiving unit 4 among the map information stored in the map database 3.

The traveling region determination unit 14 determines whether the type of the traveling region in which the own vehicle travels has changed. For example, when the own vehicle moves from the expressway to the urban area, the traveling region determination unit 14 determines that the type of the traveling region in which the own vehicle travels has changed.

The notification control unit 15 performs notification to the drivers using HMI 6. The notification control unit 15 controls a notification sound of a display screen or a speaker of HMI 6. The notification control unit 15 displays the speed limit recognized by the speed limit recognition unit 11 on the display of HMI 6 display.

When the traveling speed of the own vehicle exceeds the speed limit, the notification control unit 15 performs the speed limit excess notification to the driver of the own vehicle. The speed limit excess notification is a control for notifying that the traveling speed of the own vehicle exceeds the speed limit. The speed limit excess notification is a control for causing the driver to recognize that the traveling speed of the own vehicle exceeds the limit speed. The notification control unit 15 executes the speed limit excess notification by displaying predetermined information (for example, text or the like) using, for example, the display screen of HMI 6 display. The notification control unit 15 issues a predetermined notification sound (for example, a warning sound or the like) using, for example, a HMI 6 speaker, to execute the speed limit excess notification.

The notification control unit 15 changes the degree of the speed limit excess notification in accordance with the cumulative value of speed limit excess traveling. The degree of the speed limit excess notification is an index indicating the sensitivity of the driver to the notification. The greater the degree of the speed limit excess notification, the more likely the driver is to sense the notification, and the smaller the degree of the speed limit excess notification, the less likely the driver is to sense the notification. The degree of the speed limit excess notification is, for example, a notification timing, a notification sound volume, or the like. The larger the degree of the speed limit excess notification, the earlier the notification timing, and the smaller the degree of the speed limit excess notification, the slower the notification timing. The greater the degree of the speed limit excess notification, the higher the volume of the notification sound, and the smaller the degree of the speed limit excess notification, the lower the volume of the notification sound.

Figure 2:
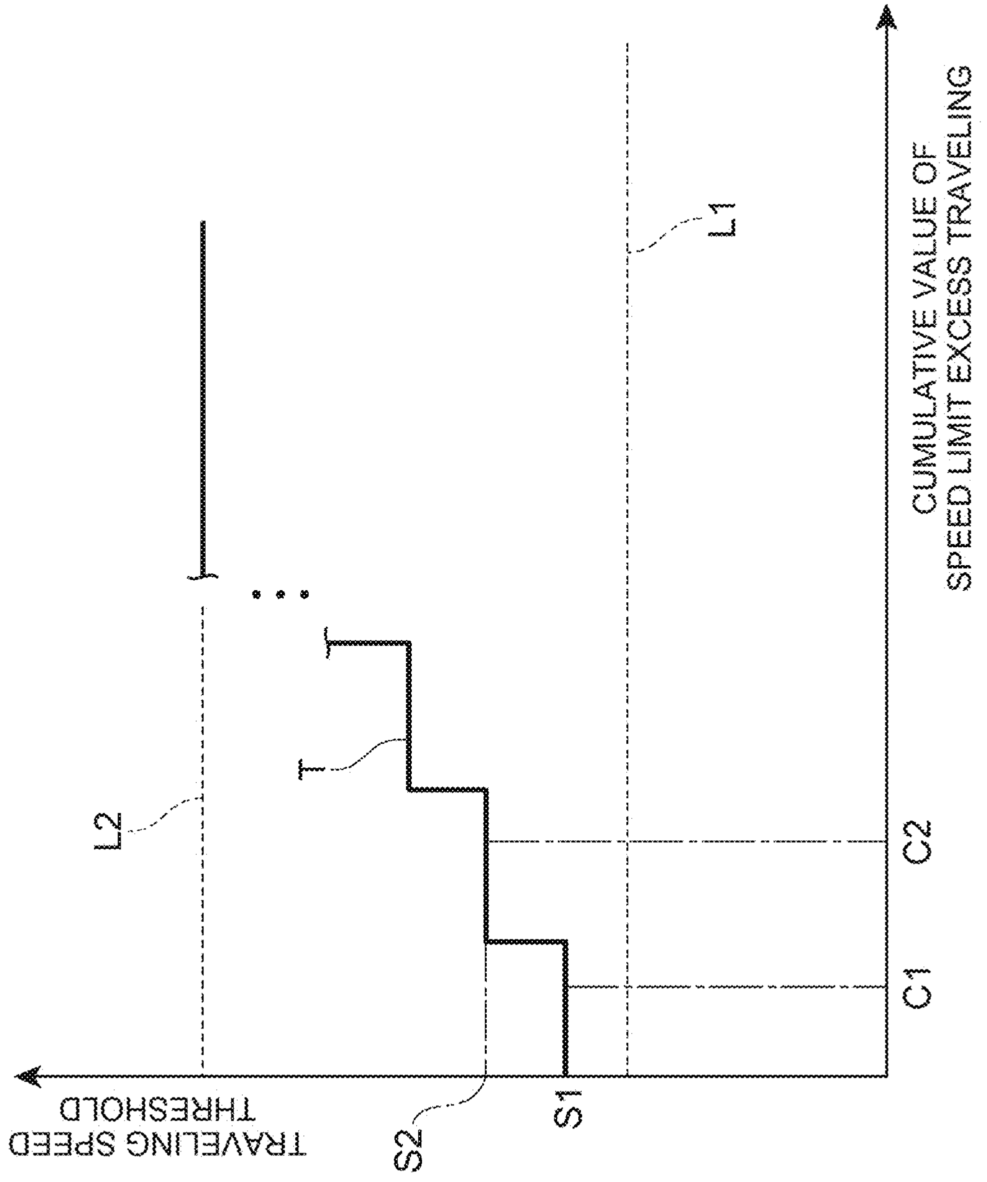
FIG. 2 is a graph illustrating a first pattern of the speed limit excess notification.

The notification control unit 15 decreases the degree of the speed limit excess notification as the cumulative value of speed limit excess traveling increases. FIG. 2 is a graph illustrating a first pattern of the speed limit excess notification. The horizontal axis of the graph shown in FIG. 2 represents the cumulative value of speed limit excess traveling (cumulative travel time or cumulative travel distance), and the vertical axis represents the traveling speed threshold of the own vehicle corresponding to the timing of the speed limit excess notification. When the traveling speed of the own vehicle exceeds the limit speed L1, the notification control unit 15 executes the speed limit excess notification at a timing when the traveling speed of the own vehicle reaches the traveling speed threshold (predetermined threshold) according to, for example, the first pattern T.

In the first pattern T, the traveling speed thresholds increase stepwise within the limits of the limit speed L1 and the maximal value L2 as the cumulative value of speed limit excess traveling increases. In other words, the notification control unit 15 increases the traveling speed threshold as the cumulative value of speed limit excess traveling increases. Specifically, for example, when the cumulative value of speed limit excess traveling is the first cumulative value C1, the notification control unit 15 executes the speed limit excess notification at a timing when the traveling speed of the own vehicle reaches the first threshold S1. The notification control unit 15, for example, executes the speed limit excess notification at a timing when the traveling speed of the own vehicle reaches the second threshold S2 when the cumulative value of speed limit excess traveling is the second cumulative value C2. The second cumulative value C2 is larger than the first cumulative value C1. The second threshold S2 is greater than the first threshold S1.

Figure 3:
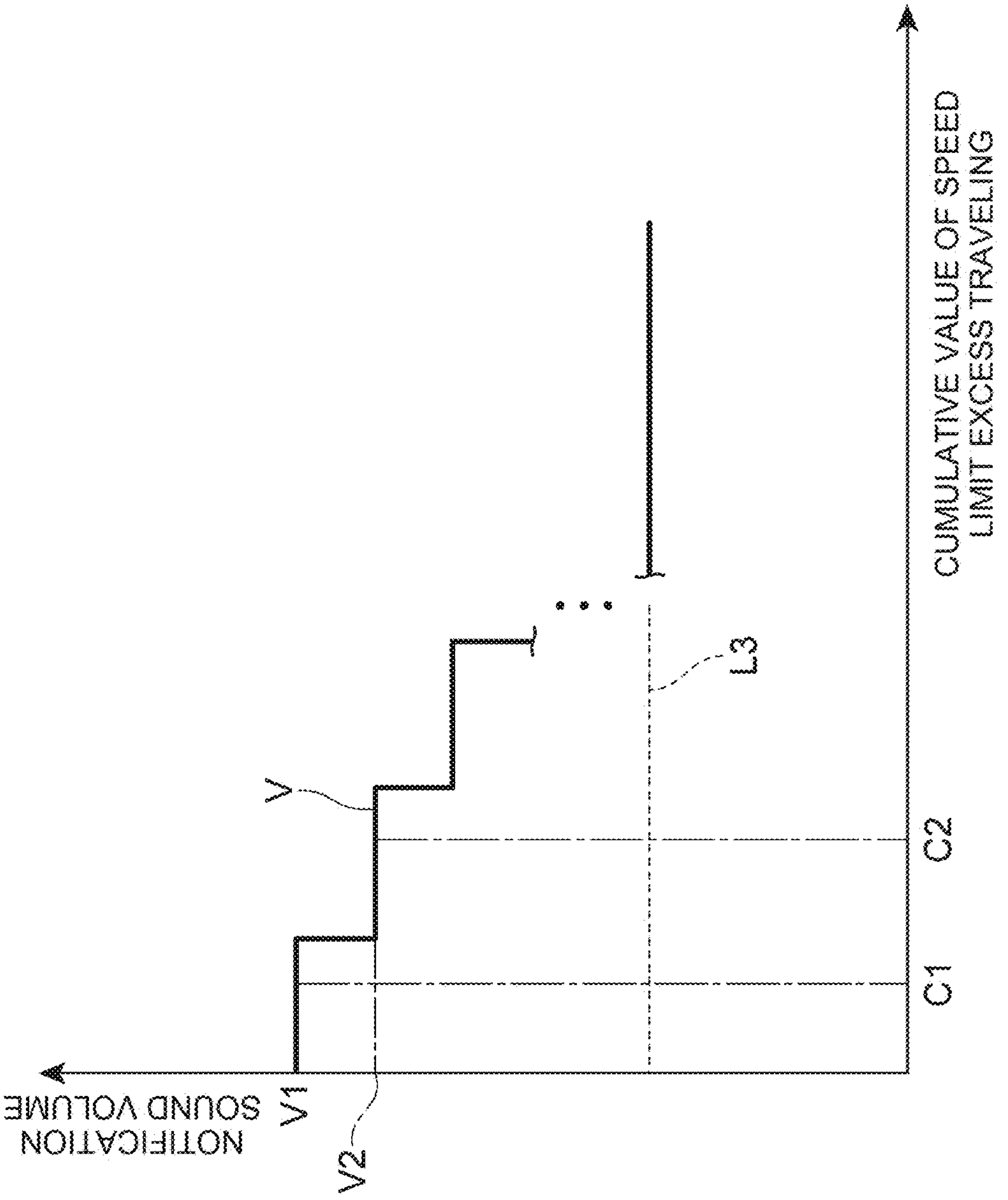
FIG. 3 is a graph showing a second pattern of speed limit excess notification.

FIG. 3 is a graph illustrating a second pattern of the speed limit excess notification. The horizontal axis of the graph shown in FIG. 3 represents the cumulative value of speed limit excess traveling (cumulative travel time or cumulative travel distance), and the vertical axis represents the volume of the notification sound. The notification control unit 15 executes the speed limit excess notification according to, for example, the second pattern V.

In the second pattern V, the volume of the notification sound gradually decreases in a range equal to or larger than the smallest value L3 in accordance with an increase in the cumulative value of speed limit excess traveling. That is, the notification control unit 15 decreases the volume of the notification sound as the cumulative value of speed limit excess traveling increases. Specifically, the notification control unit 15 adjusts the volume of the notification sound to the first volume V1, for example, when the cumulative value of speed limit excess traveling is the first cumulative value C1. The notification control unit 15 adjusts the volume of the notification sound to the second volume V2, for example, when the cumulative value of speed limit excess traveling is the second cumulative value C2. The second cumulative value C2 is larger than the first cumulative value C1. The second volume V2 is smaller than the first volume V1.

When the type of the traveling region changes, the notification control unit 15 resets the speed limit excess notification. For example, when the own vehicle moves from the expressway to the urban area, the notification control unit 15 resets the speed limit excess notification. For example, the notification control unit 15 resets the cumulative value of speed limit excess traveling to zero, and then executes the speed limit excess notification according to the first pattern T or the second pattern V.

Figure 4:
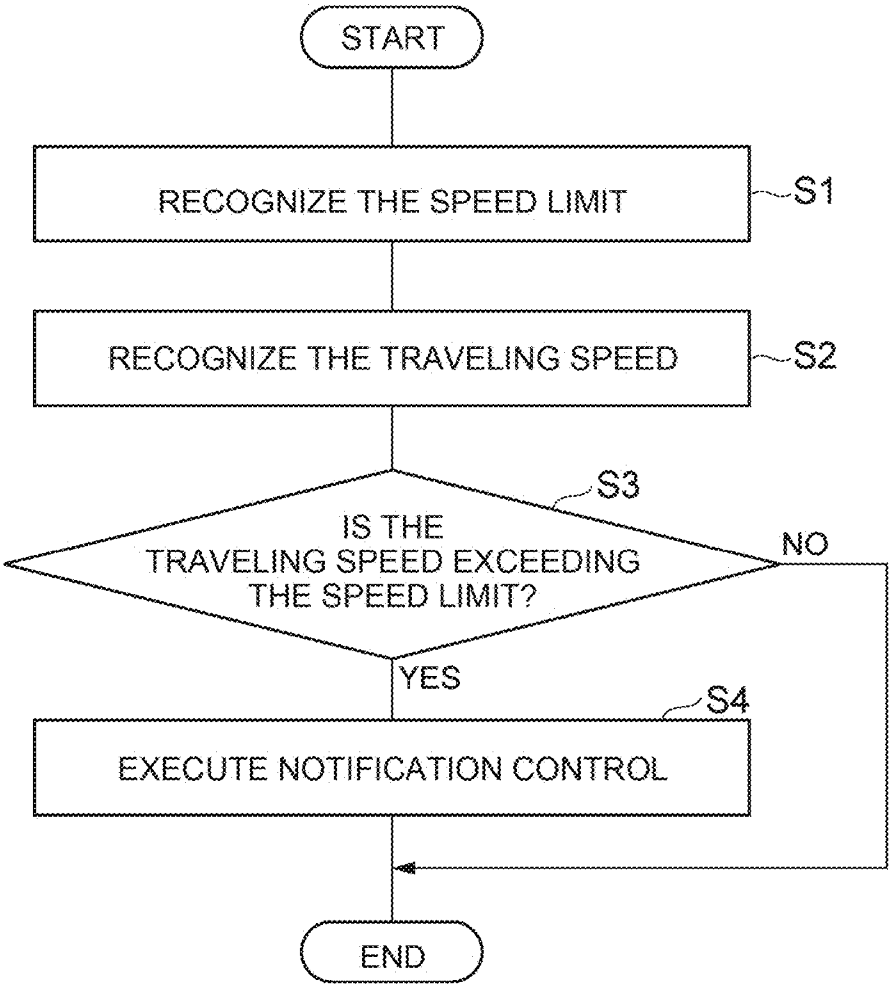
FIG. 4 is a flow chart showing a process performed by the notification device shown in FIG. 1.
Figure 5:
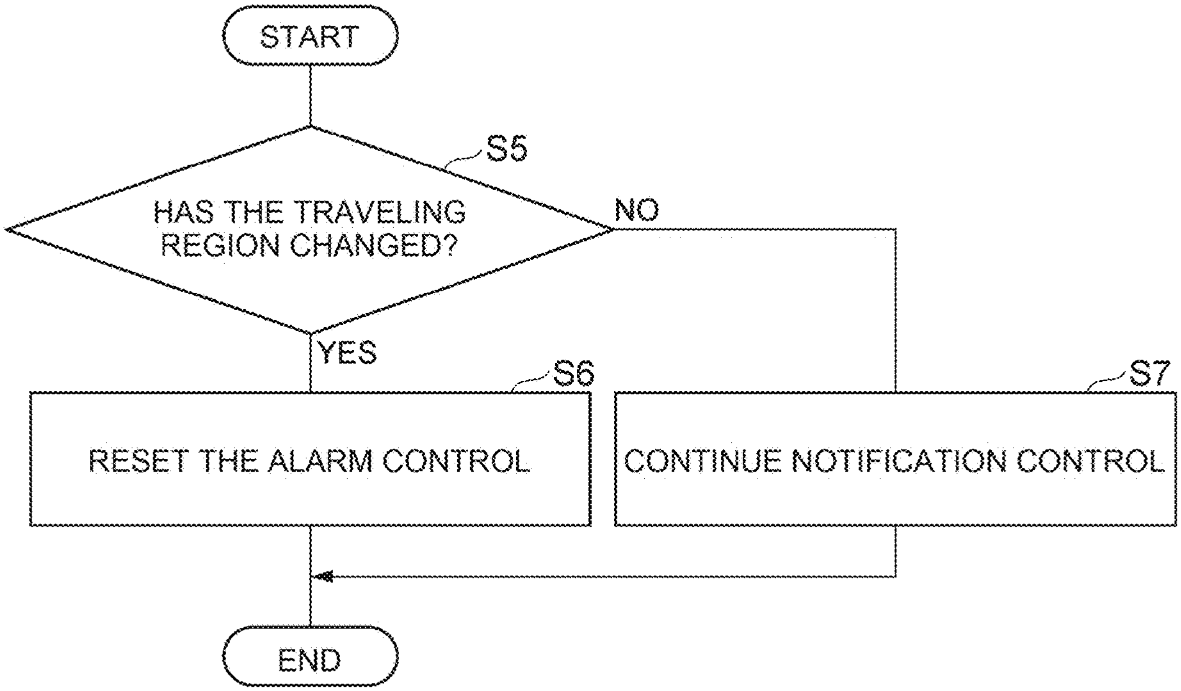
FIG. 5 is a flowchart illustrating a process performed by the notification device illustrated in FIG. 1.

Next, an exemplary process performed by ECU 10 will be described. FIG. 4 and FIG. 5 are flow charts illustrating a process performed by ECU 10. As illustrated in FIG. 4, ECU 10 recognizes a speed limit of a traveling region in which the own vehicle travels in S1. ECU 10 recognizes the traveling speed of the own vehicle in S2. ECU 10 determines, in S3, whether the traveling speed exceeds the speed limit.

ECU 10 proceeds to S4 when the traveling speed exceeds the speed limit (S3: YES). When the traveling speed does not exceed the speed limit (S3: NO), ECU 10 ends the present process. ECU 10 executes the above-described notification control (speed limit excess notification) in S4.

As illustrated in FIG. 5, ECU 10 determines whether the traveling region in which the own vehicle travels has changed in S5. When the traveling region changes (S5: YES), ECU 10 proceeds to S6. When the traveling region does not change (S5: NO), ECU 10 proceeds to S7. ECU 10 resets the notification control in S6. ECU 10 continues the notification control in S7.

As described above, in the notification device 1, the notification control unit 15 decreases the degree of the speed limit excess notification as the cumulative value of the cumulative value of speed limit excess traveling in a state in which the traveling speed of the own vehicle exceeds the limit speed increases. Thus, for example, when the tendency of the traveling speed of the own vehicle to exceed the limit speed is relatively strong, the degree of the speed limit excess notification becomes small, so that the troublesomeness of the driver is reduced. Therefore, according to the notification device 1, it is possible to reduce the troublesomeness of the driver.

The notification control unit 15 executes a speed limit excess notification at a timing when the traveling speed of the own vehicle reaches a predetermined threshold value. The notification control unit 15 increases the threshold value as the cumulative value of speed limit excess traveling increases. Accordingly, when the tendency of the traveling speed of the own vehicle to exceed the limit speed is relatively strong, the requirement of the speed limit excess notification is relaxed (for example, the timing of the speed limit excess notification is delayed), so that the troublesomeness of the driver is reduced.

The notification control unit 15 decreases the volume of the notification sound as the cumulative value of speed limit excess traveling increases. Accordingly, in a case where the traveling speed of the own vehicle is relatively stronger than the speed limit, the volume of the notification sound is reduced, and thus the troublesomeness of the driver is reduced.

The cumulative value of speed limit excess traveling is the cumulative travel time of the own vehicle in a state in which the traveling speed of the own vehicle exceeds the limit speed, or the cumulative travel distance of the own vehicle in a state in which the traveling speed of the own vehicle exceeds the limit speed. This makes it possible to appropriately control the degree of speed limit excess notification based on the cumulative traveling time or the cumulative traveling distance.

When the type of the traveling region changes, the notification control unit 15 resets the speed limit excess notification. As a result, it is possible to execute the speed limit excess notification according to the type of the traveling region.

Although the embodiments of the present disclosure have been described above, the present disclosure is not limited to the above-described embodiments. The present disclosure may be embodied in various forms with various changes and modifications, including the above-described embodiments, based on the knowledge of those skilled in the art.

The speed limit recognition unit 11 may not use the captured image of the camera 2 or the map database 3. That is, the speed limit recognition unit 11 may recognize the speed limit based on at least one of the captured image of the camera 2 and the map database.

The notification control unit 15 may execute the speed limit excess notification according to both of the first pattern T and the second pattern V, and may execute the speed limit excess notification according to either one of the first pattern T and the second pattern V.

The notification control unit 15 may perform notification to the driver using, for example, vibration of the handle. In this case, the degree of the speed limit excess notification is, for example, the strength of vibration of the handle. The notification control unit 15 may decrease the vibration intensity of the steering wheel as the cumulative value of speed limit excess traveling increases.

Resetting of the speed limit excess notification may be performed, for example, when the ignition of the own vehicle is turned ON or OFF. The reset of the speed limit excess notification may be executed by, for example, an operation of the driver.

The first pattern T or the second pattern V may be set for each type of the traveling region.

What is claimed is:

1. A notification device that executes a notification to a driver of an own vehicle, the notification device comprising:

a speed limit recognition unit that recognizes a speed limit of a traveling region in which the own vehicle travels based on at least one of a captured image of a camera of the own vehicle and a map database;

a traveling speed recognition unit that recognizes a traveling speed of the own vehicle based on a detection result of an internal sensor of the own vehicle;

a cumulative value calculation unit that calculates a cumulative value of speed limit excess traveling in a state in which the traveling speed of the own vehicle exceeds the speed limit; and a notification control unit that executes a speed limit excess notification to the driver of the own vehicle at a timing at which the traveling speed of the own vehicle reaches a predetermined threshold, when the traveling speed of the own vehicle exceeds the speed limit, wherein the notification control unit increases the predetermined threshold as the cumulative value of speed limit excess traveling increases.

2. The notification device according to claim 1, wherein the cumulative value of speed limit excess traveling is a cumulative travel time of the own vehicle in a state in which the traveling speed of the own vehicle exceeds the speed limit.

3. The notification device according to claim 1, wherein the cumulative value of speed limit excess traveling is a cumulative travel distance of the own vehicle in a state in which the traveling speed of the own vehicle exceeds the speed limit.

4. The notification device according to claim 1, wherein the notification control unit resets the speed limit excess notification when a type of the traveling region changes.

* * * * *